US010163126B2

(12) United States Patent
Morris et al.

(10) Patent No.: US 10,163,126 B2
(45) Date of Patent: Dec. 25, 2018

(54) PROMOTION VERIFICATION METHOD

(75) Inventors: Webb Morris, Smyrna, GA (US); Steven Thomas Latham, Johns Creek, GA (US); Amit Keiriwal, Orlando, FL (US)

(73) Assignee: NCR Corporation, Atlanta, GA (US)

( * ) Notice: Subject to any disclaimer, the term of this patent is extended or adjusted under 35 U.S.C. 154(b) by 463 days.

(21) Appl. No.: 13/194,450

(22) Filed: Jul. 29, 2011

(65) Prior Publication Data
US 2013/0346191 A1    Dec. 26, 2013

(51) Int. Cl.
*G06Q 30/00* (2012.01)
*G06Q 30/02* (2012.01)

(52) U.S. Cl.
CPC ..... *G06Q 30/0248* (2013.01); *G06Q 30/0225* (2013.01)

(58) Field of Classification Search
CPC ................ G06Q 30/0225; G06Q 30/0248
See application file for complete search history.

(56) References Cited

U.S. PATENT DOCUMENTS

| | | | |
|---|---|---|---|
| 7,234,609 B2* | 6/2007 | DeLazzer et al. | 221/10 |
| 8,000,496 B2* | 8/2011 | Keswani | G06K 9/00577 |
| | | | 705/14.26 |
| 2004/0193487 A1* | 9/2004 | Purcell et al. | 705/14 |
| 2006/0229944 A1* | 10/2006 | Walker et al. | 705/14 |
| 2008/0052155 A1* | 2/2008 | Tafferant et al. | 705/14 |
| 2009/0024472 A1* | 1/2009 | Andre et al. | 705/14 |
| 2009/0144164 A1* | 6/2009 | Wane et al. | 705/17 |
| 2010/0121766 A1* | 5/2010 | Sugaya et al. | 705/50 |
| 2010/0211431 A1* | 8/2010 | Lutnick et al. | 705/10 |
| 2011/0010234 A1* | 1/2011 | Lindelsee | G06Q 20/32 |
| | | | 705/14.23 |
| 2011/0047010 A1* | 2/2011 | Arnold et al. | 705/14.1 |
| 2011/0093316 A1* | 4/2011 | Baker et al. | 705/14.4 |
| 2011/0276371 A1* | 11/2011 | Norcross et al. | 705/14.1 |
| 2012/0150746 A1* | 6/2012 | Graham | 705/50 |
| 2012/0191522 A1* | 7/2012 | McLaughlin | G06Q 50/01 |
| | | | 705/14.23 |
| 2012/0324501 A1* | 12/2012 | Klein | H04N 21/478 |
| | | | 725/23 |
| 2013/0124280 A1* | 5/2013 | Yilmaz | 705/14.13 |

OTHER PUBLICATIONS http://icn-net.com/docs/ICN%20White%20Paper%20on%20POS%20Support%20of%20Digital%20Coupons%204-10b%20(2).pdf, Apr. 2010. (Year: 2010).*

\* cited by examiner

*Primary Examiner* — Michael Bekerman
(74) *Attorney, Agent, or Firm* — Schwegman, Lundberg & Woessner

(57) ABSTRACT

A promotion verification method which is based upon locally stored information. The promotion verification method includes recording entry of a promotion code by a computer, determining a key from the promotion code by the computer, and applying the key to obtain promotion information associated with the promotion code by the computer.

17 Claims, 3 Drawing Sheets

PROMOTION VERIFICATION METHOD

BACKGROUND

Entertainment kiosks are available which rent and/or sell digital media, including but not limited to movies, television shows, music, music videos, video game software, and a wide array of additional file types and file formats.

These kiosks may deliver digital media in different ways, including compact discs (CDs), digital video discs (DVDs), download to portable storage devices, and wireless download to portable storage devices.

Entertainment kiosks are connected to host servers. The kiosk periodically performs tasks, such as updating inventory, processing payment, and processing special promotions. The connection typically includes a cellular communications connection.

Entertainment kiosks may generate, disseminate, and redeem special promotions. Special promotions may include discounts, such as free rentals. In order to process a discount, a kiosk may have to connect to the host server to verify that the special promotion is valid and applicable. Verification adds delay to transactions, particular when the kiosk is offline, i.e., not connected to the host server.

It would be desirable to provide an alternative method of processing special promotions for entertainment kiosks and other promotion systems.

SUMMARY

A promotion verification method is provided.

The promotion verification method includes recording entry of a promotion code, determining a key from the promotion code, and applying the key to obtain promotion information associated with the promotion code.

The promotion verification method may be applied to entertainment transactions at an entertainment kiosk. A promotion verification method for an entertainment kiosk includes receiving a key associated with a promotion code for the promotion and corresponding promotion information encrypted using the key from a host computer during a connection with the host computer, storing the key and the promotion information in local storage, recording entry of the promotion code by a customer during a transaction involving an entertainment item, determining the key from local storage using the promotion code, and applying the key to obtain the promotion information.

The method may further include determining whether the promotion is applicable to the entertainment item and whether the promotion is expired, displaying an indication to the customer when the promotion is applicable, and including the promotion in the transaction when the promotion is applicable.

The promotion verification method may be implemented when the entertainment kiosk is not connected to the host computer.

DETAILED DESCRIPTION

Figure 1:
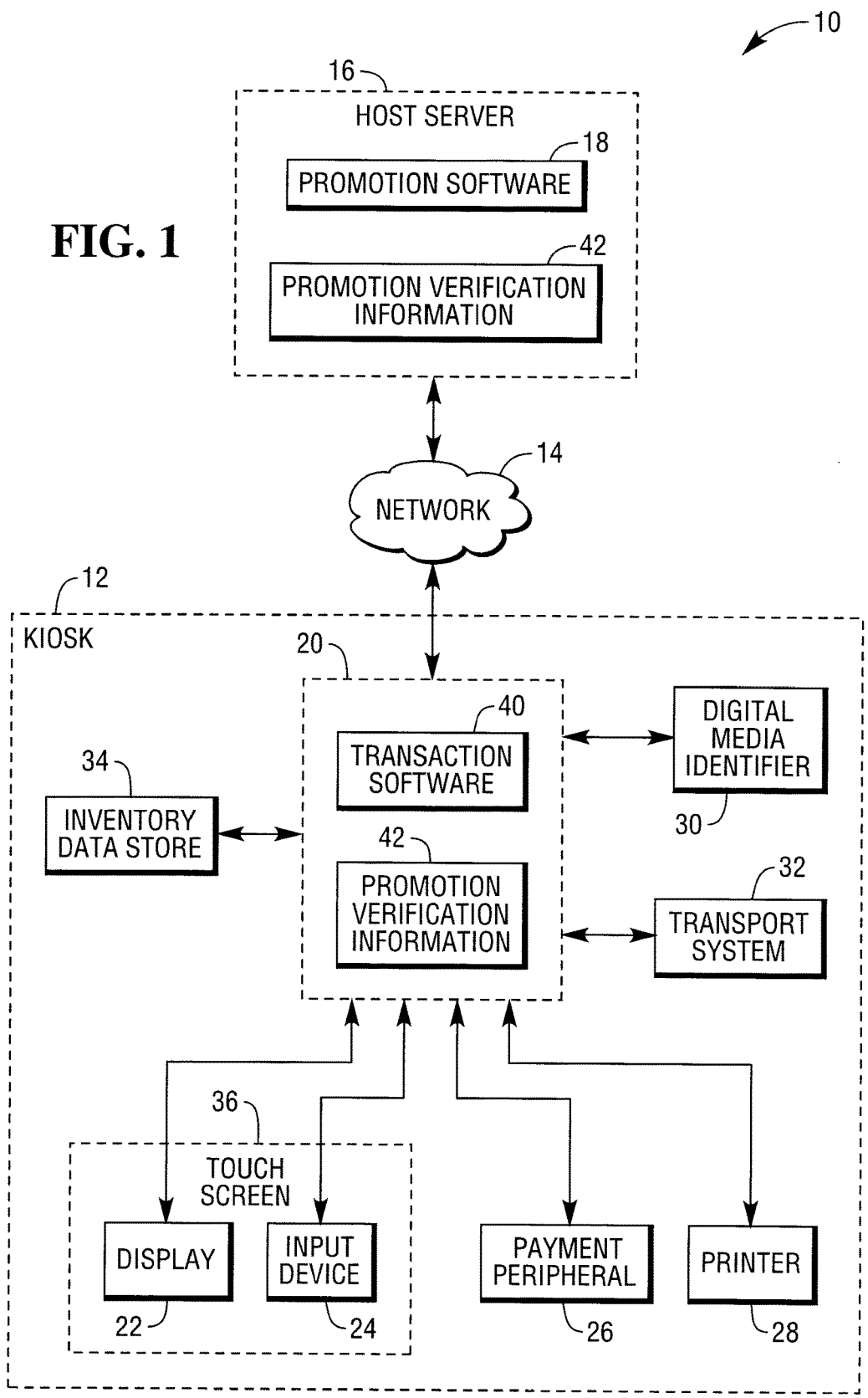
FIG. 1 is a block diagram of an example kiosk.

Referring now to FIG. 1, example kiosk 12 includes an entertainment kiosk 12. Other types of kiosks and computer systems are also envisioned.

Example kiosk 12 includes computer 20, display 22, input device 24, payment peripheral 26, and printer 28. Since example kiosk 12 is an entertainment kiosk, it includes additional components for that purpose, including digital media identifier 30, transport system 32, and inventor data store 34.

Computer 20 includes a processor, memory, and program and data storage. Computer 20 may execute an operating system such as a Microsoft operating system, and a web browser for viewing web pages.

Computer 20 controls operation of kiosk 12. Computer 20 executes transaction software 40, which displays images of screens and records operator selections from those screens during a digital media transaction.

A digital media transaction may include a rental or sale of digital media. Digital media may include, but not be limited to, movies, television shows, music, music videos, video game software, and a wide array of additional file types and file formats.

Transaction software 40 also verifies promotions presented by customers. Promotions may include discounts, alone or tied to other offers, to encourage or reward customers. An example promotion may include one rental of a movie at no cost to the customer.

Promotions may originate from host server 16. Host server 16 executes host promotion software 18, which generates promotions. In one example embodiment, promotions may be identified by promotion codes, which may be any sequence of alphanumeric characters. An example promotion code may be five to eight characters long. Promotion software 18 generates many promotion codes from a limited number of promotions, i.e., a single promotion may result in a large number of valid promotion codes.

Host server 16 sends information 42 for verifying that the promotions are valid and applicable, i.e., not fraudulent or expired, to kiosk 12 for local storage. In one example, promotion verification information 42 includes definitions of promotions, conversion software, and one or more keys. The promotion definition information defines the promotion, e.g., one free rental, and may include limitations, such as a period of time that the promotion is valid.

Host server 16 may make promotions available in various ways. For example, host server 16 may send promotions to customer email addresses. As another example, host server 16 may publish promotions on a web site. As another example, host server 16 may send promotions to kiosk 12 via network 14. Kiosk 12 displays the promotions during a transaction and/or prints the promotions on a customer receipt during the transaction. Promotions may also be delivered via traditional routes, such as direct mail advertising.

Transaction software 40 uses promotion verification information 42 from host server 16 to determine whether promotions presented by customers during transactions are valid and applicable. Advantageously, kiosk 12 need not be connected to host server 16 during verification of a promotion.

For example, promotion software 18 uses the conversion software to convert the promotion definitions to a secure form, or converts other indicia associated with the promotion definitions to a secure form, e.g., a promotion identifier having a one-to-one association with a particular promotion definition. Kiosk 12 may easily store the limited number of possible promotion definitions and keys as an alternative to storing the large number of promotion codes generated by promotion software 18.

Promotion software 18 may generate one or more keys for use in conversion and may require a passphrase in order to use a key. Promotion software 18 may further issue the passphrase as a promotion code. An example passphrase/promotional code may be five to eight characters long. In one embodiment, promotion software 18 may use commonly available encryption software to generate a public key, a private key, and a private key passphrase, and to encrypt the promotion definition (or promotion identifier) using the public key. Promotion software 18 issues the private key passphrase as the promotion code.

Promotion software 18 may produce and send out many different promotion codes for the same promotion. Host server 16 sends promotion verification information 42 to kiosk 12 during periods of network connectivity. Kiosk 12 stores promotion verification information 42 locally.

When a customer presents a promotion code during a transaction, transaction software 40 applies the promotion code to stored keys. If the promotion code has a pre-established relationship with one of the keys, transaction software applies the one key to convert an associated file to obtain the promotion definition information. In the one embodiment, transaction software 40 applies the promotion code to private keys. If the promotion code has a pre-established relationship with one of the private keys, e.g., was used to create the private key, transaction software applies the one key to decrypt an associated file to obtain the promotion definition information.

If conversion produces one of the promotion definitions, and if all limitations of the one promotion definition are satisfied, then transaction software 40 treats the promotion code as valid and includes the promotion in the transaction.

Host server 16 may periodically update promotion verification information 42 to enhance security and minimize loss from theft or unauthorized cracking of promotion verification information 42. For example, host server 16 may periodically send out one or more of new promotion definitions, a new or different version of conversion software, and a new key during periods of network connectivity between kiosk 12 and host server 16.

Display 22 displays the images of the transaction screens.

Input device 24 records operator selections during a digital media transaction. Input device 24 may include a touch sensitive overlay or a keyboard. Input device 24 and display 22 may be combined as a touch screen 36.

Payment peripheral 26 may include a card reader for reading credit, debit, and/or loyalty cards. Payment peripheral 26 may additionally include a barcode reader for reading barcodes on coupons and other promotions. Other types of kiosks may include other types of payment peripherals, such as a currency acceptor, a currency dispenser, a coin acceptor, and a coin dispenser.

Printer 28 includes a receipt printer, but may print additional information, such as coupons or other offers or promotions.

Digital media identifier 30 identifies digital media items. Digital media identifier 30 may include a radio frequency identification (RFID) reader for reading RFID tags on digital media items.

If the representative indicators include numbers or other product identifiers, customers may enter the product identifiers using input device 24.

Transport system 32 delivers digital media items from storage locations within inside kiosk 12 to customers following identification of digital media items and payment. Transport system 32 may transport physical discs or electronically download digital media items in to suitable electronic storage devices, such as customer provided mobile devices.

Digital media identifier 30 may be located along the transport path, facilitating identification. Digital media identifier 30 may also be used to identify dispensed digital media items.

Inventory data store 34 contains an inventory of digital media items within kiosk 12, either physical discs or digital media files or both. Transaction software 40 updates the inventory of digital media items each time a digital media item is dispensed or received. Transaction software 40 may also send updated inventory information to host server 16 via network 14. Host server 16 may manage inventory in a plurality of kiosks 12.

Network 14 may include a cellular communication network, a global communications network also known as the Internet, a wired or wireless network, or any combination of such networks.

Figure 2:
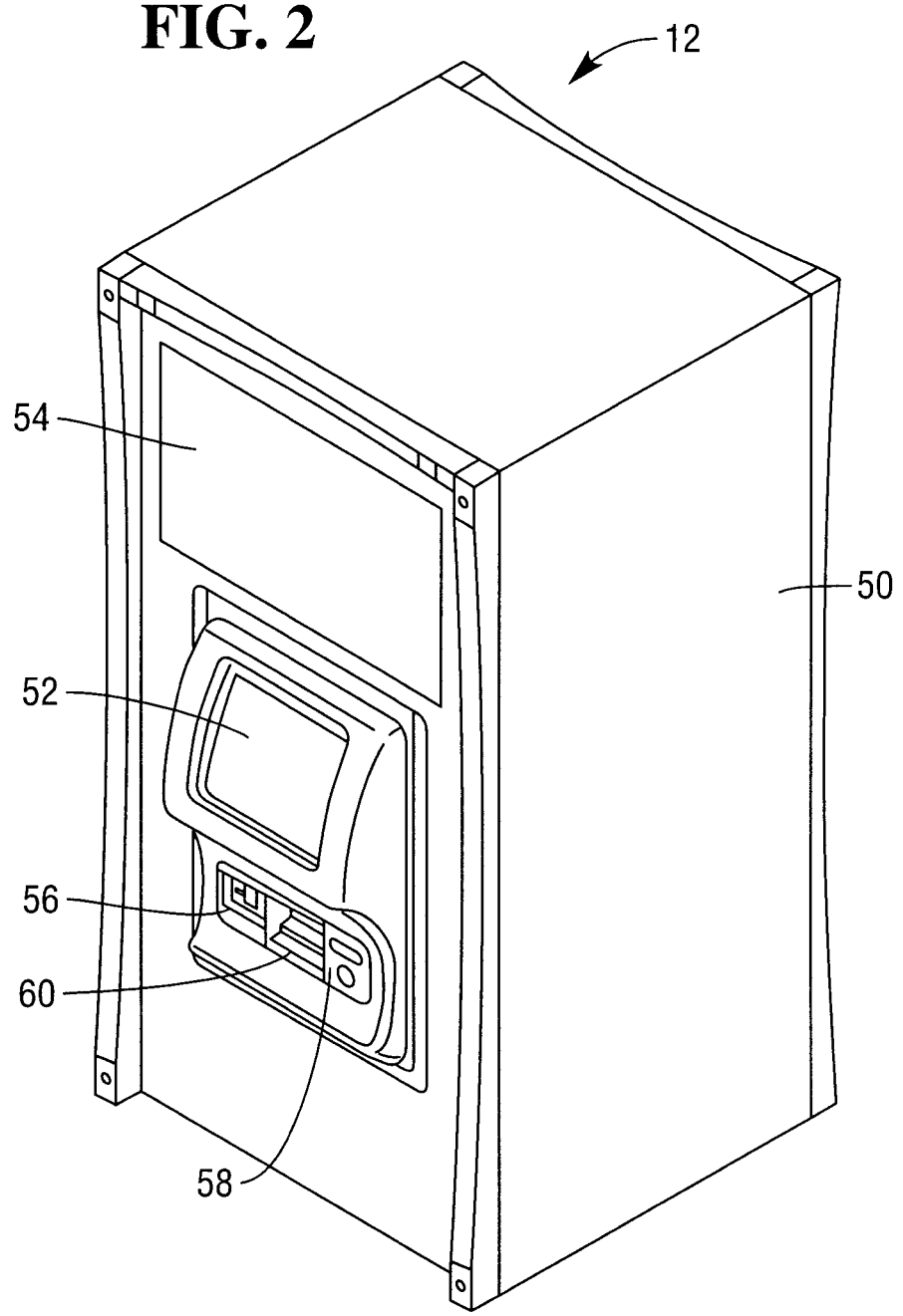
FIG. 2 is a view illustrating the example kiosk.

Referring to FIG. 2, an example kiosk 12 is illustrated.

Example kiosk 12 includes housing 50 for storing digital media items in cases. Kiosk 12 further includes touch screen 52, auxiliary display 54, card reader 56, printer 58, and dispense and retrieve port 60.

Auxiliary display 54 displays movie trailers, promotions, and other information under the control of transaction software 40.

Dispense and retrieve port 60 includes a slot from which digital media items in cases are dispensed and into which empty cases may be inserted. Digital media identifier 30 may be located in dispense and retrieve port 60 or on transport system 32.

Figure 3:
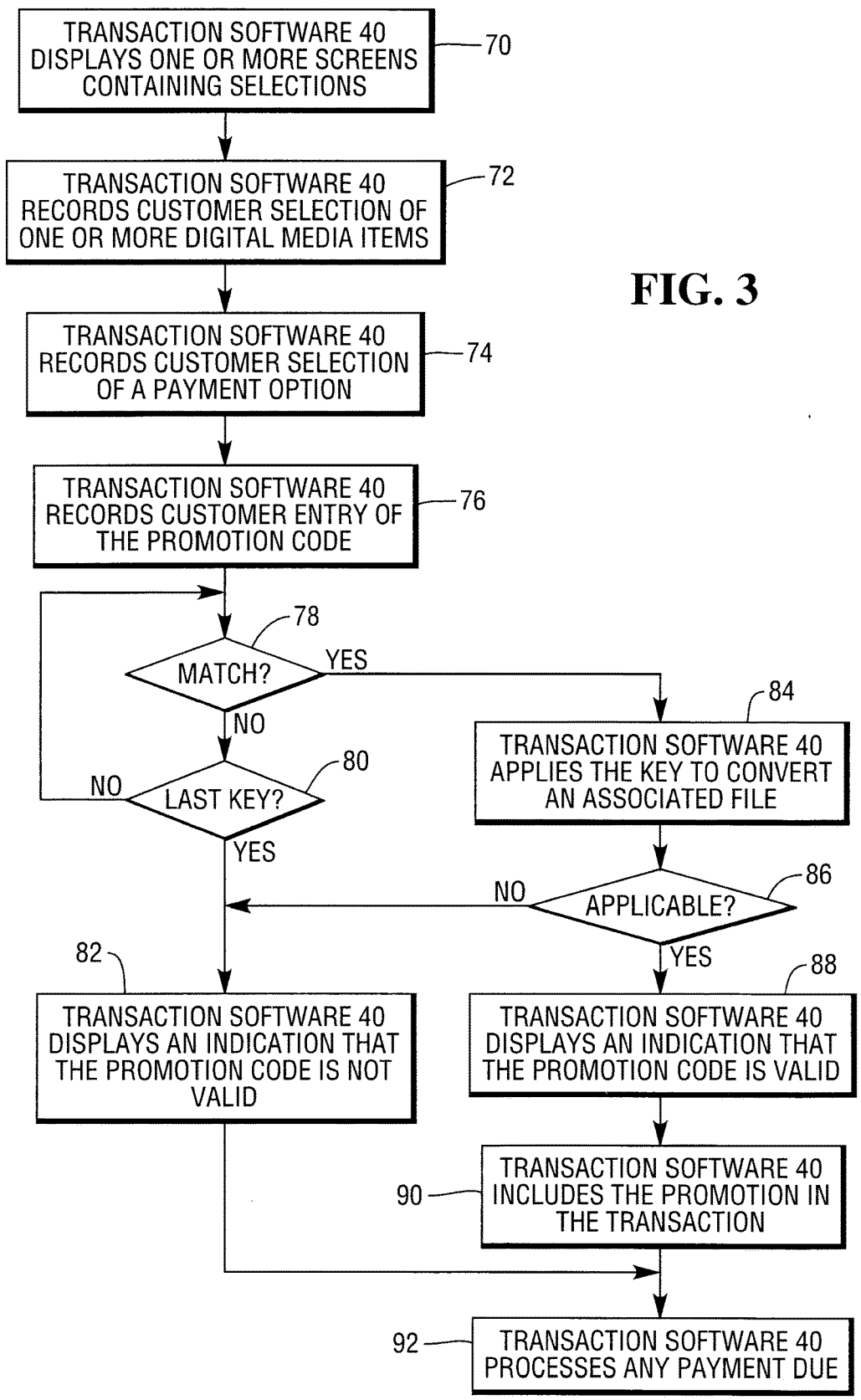
FIG. 3 is a flow diagram illustrating an example digital media transaction method.

Referring now to FIG. 3, an example digital media transaction method begins with step 70.

In step 70, transaction software 40 displays one or screens containing selections for digital media items and instructions for completing a digital media rental transaction.

In step 72, transaction software 40 records customer selection of one or more digital media items via touch screen 36.

In step 74, transaction software 40 records customer selection of a payment option via touch screen 36 where the payment option includes entry of a promotion code.

In step 76, transaction software 40 records customer entry of the promotion code via touch screen 36. Other methods of entering promotion codes are also envisioned. For example, a customer may scan a barcode containing the promotion code from an email, flyer, coupon, or other document referencing a promotion using a barcode reader.

In step 78-80, transaction software 40 uses the conversion software to apply the promotion code as a passphrase against stored keys until a key is found that has a pre-established relationship with the promotion code, or until all keys have been examined and no such key is found. If the promotion code has a pre-established relationship with one of the keys, operation proceeds to step 84. Otherwise, operation proceeds to step 82.

In step 82, transaction software 40 displays an indication that the promotion code is not valid. Operation proceeds to step 92.

In step 84, transaction software 40 applies the key to convert an associated file to obtain promotion definition information or a promotion identifier.

In step 86, transaction software 40 examines the promotion definition for applicability. If all limitations of the promotion definition are satisfied, operation proceeds to step 88. Otherwise, operation proceeds to step 82.

In step 88, transaction software 40 displays an indication that the promotion code is valid.

In step 90, transaction software 40 includes the promotion in the transaction. For example, if the promotion includes a discount, transaction software 40 applies the discount to the transaction total to obtain a reduced transaction total.

In step 92, transaction software 40 processes any payment due. For example, transaction software 40 processes a credit card payment via payment peripheral 26. Transaction software 40 may cause printer 28 to print a receipt with another promotion code.

Advantageously, no kiosk-to-server connection is required during verification, nor is a local cache of promotion codes. The solution facilitates generation and of massive numbers of valid promotional codes with little effort and no requirement to store these promotional codes in kiosk 12.

Although particular reference has been made to certain embodiments, variations and modifications are also envisioned within the spirit and scope of the following claims.

The invention claimed is:

1. A promotion verification method comprising:
receiving, at a kiosk from a host server during a first period of network connectivity, a plurality of private keys including a private key corresponding to encrypted promotion information, the encrypted promotion information encrypted using a public key created with the private key;
storing, in local storage of the kiosk, the private key and the encrypted promotion information;
disconnecting from the host server to end the first period of network connectivity and start a disconnected period;
recording entry of a promotion code scanned or entered at the kiosk;
determining, using a processor of the kiosk, whether the promotion code includes a private key passphrase that unlocks the private key during the disconnected period;
retrieving the private key from the local storage during the disconnected period in response to determining that the private key passphrase unlocks the private key;
decrypting the promotion information using the private key; and
displaying, at a display device of the kiosk, an indication that the promotion code is valid in response to decrypting the promotion information.

2. The method of claim 1, wherein the recording step comprises:
recording entry of the promotion code via a touch screen of the kiosk.

3. The method of claim 1, wherein the recording step comprises:
recording entry of the promotion code via a code reader of the kiosk.

4. The method of claim 1, wherein displaying the indication comprises:
displaying the promotion information at the display device of the kiosk.

5. The method of claim 1, further comprising:
ending the disconnected period by entering a second period of network connectivity after displaying the indication that the promotion code is valid.

6. The method of claim 5, further comprising:
during the second period of network connectivity, receiving an update to the plurality of private keys.

7. The method of claim 1, further comprising:
recording entry of a second promotion code scanned or entered at the kiosk;
determining, using the processor of the kiosk, whether the second promotion code includes a second private key passphrase that unlocks the private key during the disconnected period;
retrieving the private key from the local storage during the disconnected period in response to determining that the second private key passphrase unlocks the private key;
decrypting the promotion information using the private key; and
displaying, at a display device of the kiosk, an indication that the second promotion code is valid in response to decrypting the promotion information.

8. The method of claim 1, further comprising:
recording entry of the promotion code by a customer during a transaction involving an entertainment item by the kiosk.

9. The method of claim 8, further comprising:
applying the promotion to the transaction at the kiosk.

10. The method of claim 1, further comprising:
determining whether the promotion is expired before displaying the indication at the display device.

11. The method of claim 1, further comprising:
displaying, at the display device of the kiosk, a selection for a digital media item corresponding to the promotion information;
applying a promotion value corresponding to the promotion information to the digital media item; and
delivering the digital media item using a connection device of the kiosk.

12. A promotion verification method comprising:
determining a promotion including promotion information at a host server;
creating a plurality of promotion codes including a promotion code, the plurality of promotion codes associated with the promotion at the host server;
creating a public key to encrypt the promotion information and a private key to decrypt the promotion information at the host server;
encrypting the promotion information using the public key by the host server;
password protecting the private key using the plurality of promotion codes, wherein any promotion code of the plurality of promotion codes unlocks the private key;
sending the private key and the encrypted promotion information to a transaction computer during a first period of network connectivity of the transaction computer;
wherein the promotion code is redeemed and verified at the transaction computer during a disconnected period following the first period of network connectivity at the transaction computer using the private key and the encrypted promotion information stored in local storage of the transaction computer.

13. An entertainment kiosk comprising:
communications circuitry to:
receive, from a host server during a first period of network connectivity, a plurality of private keys including a private key corresponding to encrypted promotion information, the encrypted promotion information encrypted using a public key created with the private key; and
disconnect from the host server to end the first period of network connectivity and start a disconnected period;

a code input device to receive entry of a promotion code;
local storage to store the private key and the encrypted promotion information;
a processor to:
    record entry of the promotion code by a customer during a transaction involving an entertainment item via the code input device;
    determine whether the promotion code includes a private key passphrase that unlocks the private key during the disconnected period;
    retrieve the private key from the local storage during the disconnected period in response to determining that the private key passphrase unlocks the private key;
    decrypt the promotion information using the private key; and
a display device to: display an indication that the promotion code is valid in response to the processor decrypting the promotion information.

14. The kiosk of claim 13, wherein the processor is further to determine whether the promotion code is applicable to the entertainment item and not expired.

15. The kiosk of claim 13, wherein the processor is further to determine that the promotion is applicable to the transaction and wherein to display the indication that the promotion code is valid, the display device is to apply the promotion information to the transaction.

16. The kiosk of claim 13, wherein the code input device comprises a touch sensitive overlay.

17. The kiosk of claim 13, wherein the code input device comprises a barcode reader.

* * * * *